(12) United States Patent
Holmes et al.

(10) Patent No.: US 7,748,481 B2
(45) Date of Patent: Jul. 6, 2010

(54) HYBRID POWERTRAIN FOR HOMOGENEOUS CHARGE COMPRESSION IGNITION ENGINE OPERATION

(75) Inventors: Alan G. Holmes, Clarkston, MI (US); Peter J. Savagian, Bloomfield Hills, MI (US); Mark A. Theobald, Bloomfield Hills, MI (US); Eric M. Rask, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1120 days.

(21) Appl. No.: 11/402,725

(22) Filed: Apr. 12, 2006

(65) Prior Publication Data

US 2007/0240920 A1    Oct. 18, 2007

(51) Int. Cl.
*B60K 6/00* (2007.10)
(52) U.S. Cl. .................................. 180/65.21; 180/65.7
(58) Field of Classification Search ............. 180/65.21, 180/65.28, 65.31, 65.7
See application file for complete search history.

(56) References Cited

U.S. PATENT DOCUMENTS

| | | | |
|---|---|---|---|
| 6,209,672 B1 * | 4/2001 | Severinsky | 180/65.23 |
| 6,223,846 B1 * | 5/2001 | Schechter | 180/165 |
| 6,230,683 B1 * | 5/2001 | zur Loye et al. | 123/435 |
| 6,520,142 B2 * | 2/2003 | Nogi et al. | 123/299 |
| 6,527,658 B2 | 3/2003 | Holmes et al. | 475/5 |
| 6,796,287 B2 * | 9/2004 | Mogi et al. | 123/319 |
| 6,834,626 B1 | 12/2004 | Holmes | 123/52.5 |
| 6,932,175 B2 * | 8/2005 | Teraji et al. | 180/65.23 |
| 6,938,598 B1 * | 9/2005 | Lewis et al. | 123/179.1 |
| 7,174,879 B1 * | 2/2007 | Chol et al. | 123/406.21 |
| 7,231,998 B1 * | 6/2007 | Schechter | 180/165 |
| 7,469,672 B2 * | 12/2008 | Andri | 123/198 F |

* cited by examiner

*Primary Examiner*—Paul N Dickson
*Assistant Examiner*—Bridget Avery
(74) *Attorney, Agent, or Firm*—Quinn Law Group, PLLC

(57) ABSTRACT

A hybrid powertrain is provided including an internal combustion engine sufficiently configured for operation in a homogeneous charge compression ignition mode of operation. An electric motor and an electric storage device are provided in parallel hybrid combination with the internal combustion engine. A transmission is operatively connected to the internal combustion engine and the electric motor. The engine may operate in one of a two-stroke and a four-stroke cycle.

19 Claims, 2 Drawing Sheets

US 7,748,481 B2

HYBRID POWERTRAIN FOR HOMOGENEOUS CHARGE COMPRESSION IGNITION ENGINE OPERATION

TECHNICAL FIELD

The present invention relates to hybrid powertrains having one of a two-stroke and four-stroke internal combustion engine operatively connected to a motor and energy storage device in hybrid combination with the internal combustion engine, such that the internal combustion engine can operate exclusively or primarily in a homogeneous charge compression ignition mode of operation over a wide range of engine load.

BACKGROUND OF THE INVENTION

Four-stroke and two-stroke internal combustion engines, especially automotive internal combustion engines, generally fall into one of two categories, spark ignition engines and compression ignition engines. Traditional spark ignition engines, such as gasoline engines, typically function by introducing a fuel/air mixture into the engine's cylinders, which is then compressed and ignited by a spark plug. Traditional compression ignition engines, such as diesel engines, typically function by introducing or injecting pressurized fuel into the engine's cylinders near top dead center (TDC) of the compression stroke. Both traditional gasoline engine and diesel engine combustion involve premixed or diffusion flames that are controlled by fluid mechanics. Each type of engine has advantages and disadvantages.

More recently, other types of combustion methodologies or concepts have been introduced for internal combustion engines. One of these combustion concepts is known in the art as the homogeneous charge compression ignition (HCCI) engine. HCCI is a distributed, flameless, controlled auto-ignition combustion process that is controlled by oxidation chemistry, rather than by fluid mechanics. Because HCCI is a distributed, kinetically controlled combustion process HCCI engines can operate with a very dilute fuel/air mixture having a relatively low peak combustion temperature, thus forming low levels of NOx emissions. The fuel/air mixture for HCCI combustion is relatively homogeneous, and, therefore, the locally fuel rich zones that form smoke and particulate emissions are eliminated.

At medium engine speed and load, recirculated or trapped exhaust gas may be used to heat the intake charge in order to encourage auto-ignition. This method, however, does not work satisfactorily at or near idle speed and load conditions. At or near idle speed and load, there may be insufficient heat energy within the exhaust to heat the intake air thereby enabling stable auto-ignition. As a result, at the idle condition, the cycle-to-cycle variability of the combustion process is too high to allow stable auto-ignition combustion. Consequently, one of the main difficulties in operating HCCI engine has been to control the combustion process properly such that robust and stable combustion with low emissions, optimal heat release rate, and low noise can be achieved over a range of operating conditions.

SUMMARY OF THE INVENTION

A hybrid powertrain for a vehicle is provided including an internal combustion engine sufficiently configured for operation in a homogeneous charge compression ignition mode of operation. Also provided are a motor and an energy storage device, such as an electric motor and battery, in hybrid combination with the internal combustion engine, and capable of propelling the vehicle at low speeds irrespective of operation of the internal combustion engine. The motor and energy storage device can provide power during times of low engine load when stable operation in the homogenous charge compression ignition is difficult to maintain. A transmission is operatively connected to the internal combustion engine and the electric motor. The transmission may employ one or two motors to enable the transmission to operate in a continuously variable mode of operation.

The internal combustion engine may be a two-stroke engine having a cylinder block defining a cylinder bore. An intake port may be provided for admitting intake air into the cylinder bore and an exhaust port for communicating exhaust gas from the cylinder bore. A piston is reciprocally translatable within the cylinder bore between a top dead center position and a bottom dead center position, wherein the piston is operable to selectively block the intake and exhaust ports. A fuel injector may be configured to directly inject fuel into the cylinder bore for combustion with the intake air. A controller may be operatively connected to the fuel injector and sufficiently configured to effect the homogeneous charge compression ignition mode of operation.

The internal combustion engine may be a four-stroke engine having a cylinder block defining a cylinder bore. An intake port for admitting intake air into the cylinder bore and an intake valve operable to selectively communicate the intake air from the intake port to the cylinder bore may be provided. An exhaust port for communicating exhaust gas from the cylinder bore and an exhaust valve operable to selectively communicate the exhaust gas from the cylinder bore to the exhaust port may also be provided. A piston is reciprocally translatable within the cylinder bore between a top dead center position and a bottom dead center position. A fuel injector may be configured to directly inject fuel into the cylinder bore for combustion with the intake air. Further, a controller may be operatively connected to the fuel injector and sufficiently configured to effect the homogeneous charge compression ignition mode of operation.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
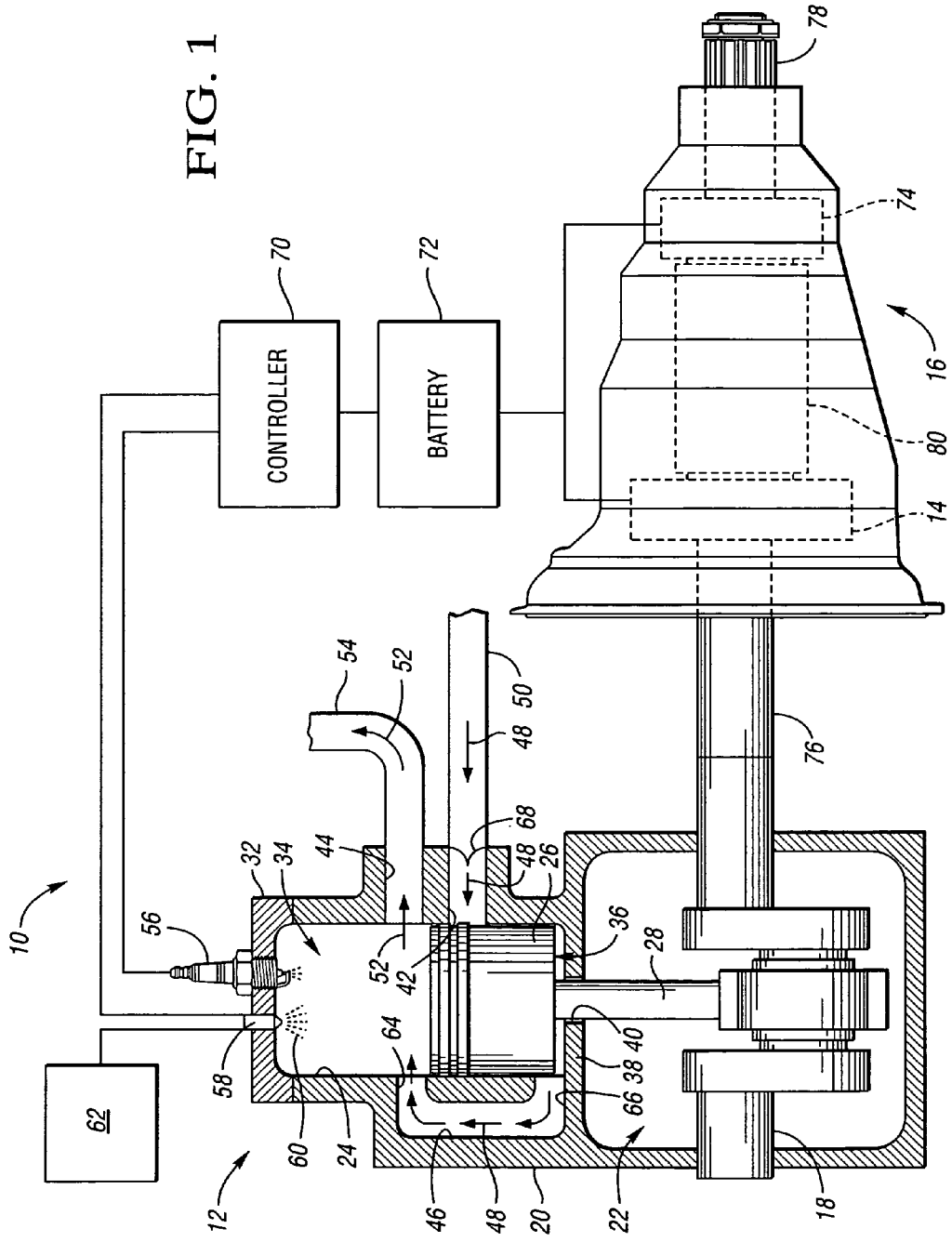
FIG. 1 is a schematic side view (not to scale) of a vehicle powertrain having a two-stroke internal combustion engine, shown in partial cross section, sufficiently configured to operate in a homogeneous charge compression ignition (HCCI) operating mode and in hybrid combination with an electric motor and transmission.

Referring to FIG. 1, a hybrid powertrain 10 is schematically depicted. The hybrid powertrain 10 includes two-stroke internal combustion engine 12, a motor, such as electric motor 14, and a transmission 16. The two-stroke internal combustion engine 12 includes a crankshaft 18 operatively connected to the transmission 16 and the electric motor 14 so that the two-stroke internal combustion engine 12 and the electric motor 14 are in parallel hybrid combination. The two-stroke internal combustion engine 12 is operable in a controlled auto-ignition, or homogeneous charge compression ignition (HCCI), mode of operation.

The two-stroke internal combustion engine 12 includes a cylinder case or block 20 defining a crankcase volume 22. The cylinder block 20 further defines a cylinder bore 24 within which a piston 26 is reciprocally movable. The piston 26 is mounted to a connecting rod 28, which in turn, is mounted to the crankshaft 18 to provide reciprocal motion within the cylinder bore 24 between a bottom dead center, or BDC, position and a top dead center, or TDC, position. The crankshaft 18 is disposed at least partially within the crankcase volume 22 and is rotatably supported by the cylinder block 20. The piston 26, connecting rod 28 and crankshaft 18 work in concert to convert the reciprocal motion of the piston 26 into rotational motion of the crankshaft 18. A cylinder head 32 is removably mounted with respect to the cylinder block 20 and operates to close one end of the cylinder bore 24. The piston 26, cylinder bore 24, and cylinder head 32 cooperate to form a variable volume combustion chamber 34. A variable volume chamber 36 is provided on the side of the piston 26 opposite the variable volume combustion chamber 34 and is defined by the piston 26, cylinder bore 24, and a wall portion 38 of the cylinder block 20. The wall portion 38 substantially separates the variable volume chamber 36 from the crankcase volume 22. An orifice 40 is defined by the wall portion 38 and is sufficiently configured to receive the connecting rod 28 therethrough.

The cylinder block 20 defines an intake port 42, an exhaust port 44 and a transfer port 46. The intake port 42 operates to selectively communicate intake air 48 from an intake manifold 50 to the variable volume chamber 36. The transfer port 46 operates to selectively communicate intake air 48 from the variable volume chamber 36 to the variable volume combustion chamber 34. Additionally, the exhaust port 44 operates to selectively communicate products of combustion or exhaust gases 52 from the variable volume combustion chamber 34 to an exhaust manifold 54 for subsequent release to the atmosphere. The piston 26 operates to selectively block the intake port 42, exhaust port 44, and transfer port 46 as the piston 26 reciprocates within the cylinder bore 24.

An ignition device or spark plug 56 and a fuel injector 58 are provided at least partially within the cylinder head 32. The fuel injector is configured and positioned to inject fuel 60, from a pressurized fuel source 62, directly into the variable volume combustion chamber 34. Alternative fueling strategies, such as port fuel injection and throttle body fuel injection may also be used in conjunction with certain aspects of the present invention; however, the preferred approach is direct injection. Similarly, while widely available grades of gasoline and light ethanol blends thereof are preferred fuels, alternative liquid and gaseous fuels such as higher ethanol blends (E80, E85, etc.), neat ethanol (E99), neat methanol (M100), natural gas, hydrogen, biogas, various reformates, syngases, etc. may also be used in the implementation of the present invention. The spark plug 56 extends through the cylinder head 32 to the variable volume combustion chamber 34 and operates to provide an ignition source for a mixture of fuel 60 and intake air 48 within the variable volume combustion chamber 34 during spark ignition operation of the internal combustion engine 12.

As the piston moves from the TDC position to the BDC position within the cylinder bore 24, the exhaust port 44 and passage 64 of the transfer port 46 is unblocked by the piston 26. Additionally the variable volume chamber 36 will reduce in volume, thereby forcing intake air 48 contained therein into the transfer port 46 via a passage 66. The intake air 48 enters the variable volume combustion chamber 34 with sufficient momentum to force exhaust gases 52 into exhaust port 44 to effect exhaust scavenging. A reed valve 68 is provided intermediate the intake manifold 50 and the intake port 42 and operates to disallow the flow of intake air 48 from the variable volume chamber 36 to the intake manifold 50 during the downward stroke of the piston 26.

As the piston 26 moves from the BDC position to the TDC position, the upper passage 64 of the transfer port 46 and the exhaust port 44 are blocked by the piston 26 such that a mixture of intake air 48 and fuel 60 are compressed within the variable volume combustion chamber 34 to produce conditions favorable for combustion therein. The vacuum created within the variable volume chamber 36 during the upstroke of the piston 26 will force intake air 48 through the reed valve 68 and into the variable volume chamber 36.

In operation, during light to moderate engine loads, the internal combustion engine 12 operates in a HCCI combustion mode, wherein fuel 60 is injected earlier than is typical to allow adequate premixing of fuel 60 and intake air 48. This fuel injection event occurs slightly after the piston 26 begins movement from the BDC to TDC position. The amount of fuel injected provides a sufficiently lean of stoichiometric air/fuel ratio such that premature auto-ignition of the mixture is substantially avoided. As the piston 26 moves closer to TDC, a second injection of fuel 60 is performed. This second injection operates to enrich the air/fuel ratio within the variable volume combustion chamber 34 to allow auto-ignition to occur. Those skilled in the art will recognize other fuel injection strategies capable of enabling the HCCI mode of operation including varying the fuel injection timing as well as reducing or increasing the amount of fuel injected and the number of fuel injection events. The HCCI mode of operation is generally characterized as a controlled auto-ignition process with a lean of stoichiometric air/fuel ratio or a stoichiometric air/fuel ratio. The HCCI combustion process is further characterized by the lack of spark provided by the spark plug 56 to initiate combustion of the mixture of intake air 48 and fuel 60. At very light engine loads and high engine loads the HCCI combustion may become unstable leading to rough engine operation. At higher engine loads, it may be beneficial to operate the internal combustion engine 12 in a spark ignited mode of operation wherein the total amount of fuel 60 is injected into the variable volume combustion chamber 34. Subsequently, the mixture of intake air 48 and fuel 60 is compressed by the piston 26 and ignited via a spark initiated by the spark plug 56 at a predetermined time.

An electronic control module, or controller 70, is preferably a programmable digital computer, which includes the standard elements of a central processing unit, random access memory, read only memory, analog-to-digital converter, input/output circuitry, and clock circuitry. The controller 70 is suited to receive information regarding various engine parameters from various sensors, not shown, connected to the engine. Upon receipt of such information, the controller 70 performs required computations and provides output signals, which are transmitted to various operating systems that affect the operation of the internal combustion engine 12. The controller 70 is configured to provide command signals to the spark plug 56 and fuel injector 58.

The electric motor 14 is operatively connected to an energy storage device such as battery 72 that selectively transmits energy to the electric motor 14 so that the electric motor 14 contributes to the power output of the transmission 16. Additionally, the electric motor 14 is operable to effect propulsion of a vehicle equipped with the hybrid powertrain at low speed irrespective of the operation of the internal combustion engine 12. The transmission 16 is preferably a continuously variable transmission. More specifically, the transmission 16 depicted in FIG. 1 is an electrically variable transmission (EVT). Accordingly, transmission 16 includes a second electric motor 74, an input shaft 76 that is connected to the crankshaft 18 for unitary rotation therewith, an output shaft 78, and differential gearing 80. The differential gearing 80 is operatively connected to the electric motors 14, 74, the input shaft 76 and the output shaft 78. The controller 70 is operatively connected to the battery 72 and electric motors 14 and 74 to control the speed of the electric motors 14, 74 and thereby vary the speed ratio between the input shaft 76 and the output shaft 78. An exemplary EVT is described in U.S. Pat. No. 6,527,658, issued Mar. 4, 2003 to Holmes et al., which is hereby incorporated by reference in its entirety. The transmission 16 preferably has a first mode of operation in which one of the electric motors 14 or 74 enables the transmission 16 to continuously vary the speed ratio through the transmission 16, and a second mode of operation where two electric motors 14 and 74 are used to continuously vary the speed ratio through the transmission 16. Those skilled in the art will recognize that closely spaced fixed step gear ratios, such as steps of 1.4 or less, may be used with the present invention in lieu of a continuously variable mode of operation.

Figure 2:
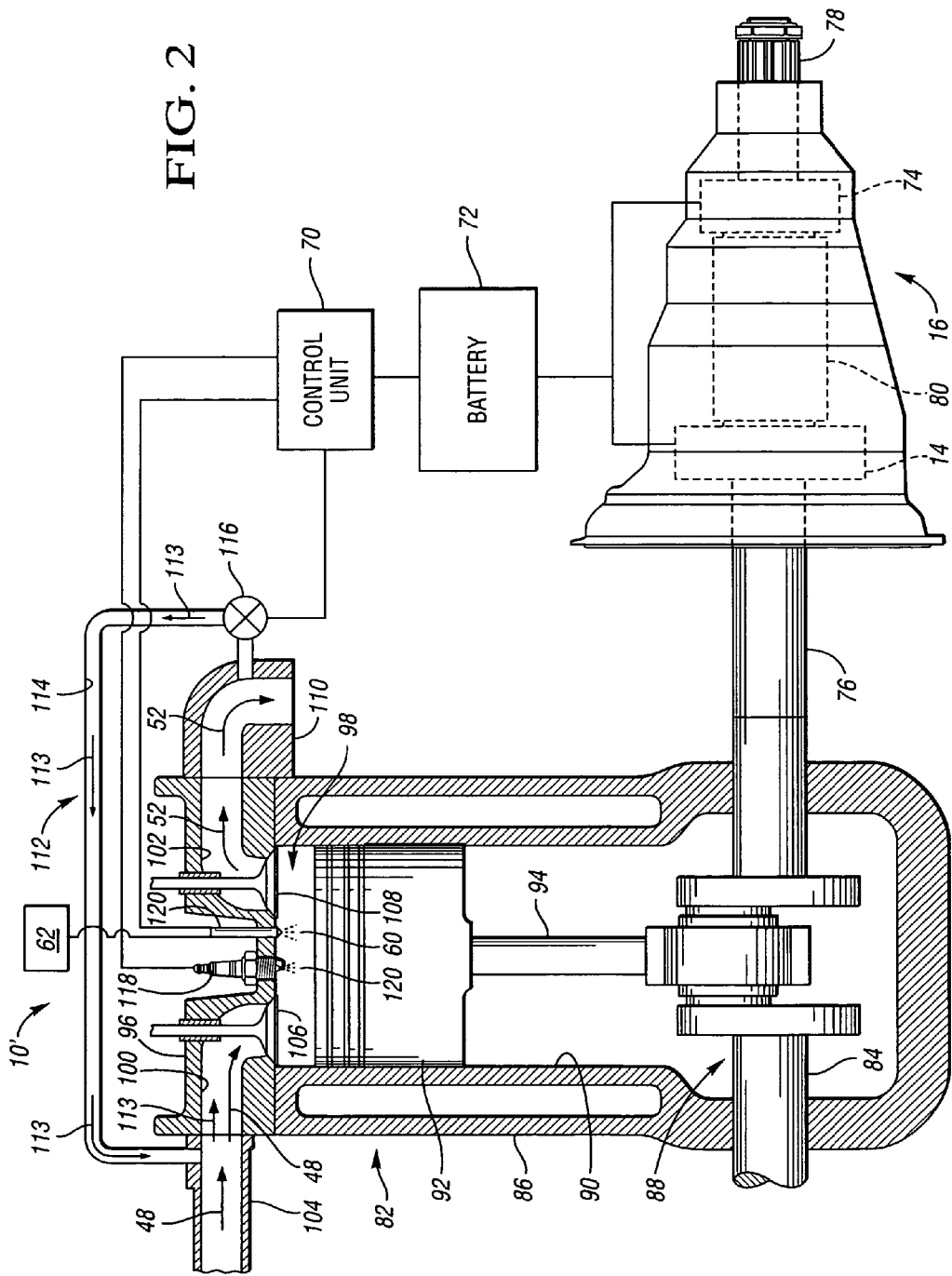
FIG. 2 is a schematic side view (not to scale) of a vehicle powertrain having a four-stroke internal combustion engine, shown in partial cross section, sufficiently configured to operate in the HCCI operating mode and in hybrid combination with the electric motor and transmission of FIG. 1.

Referring now to FIG. 2, wherein like reference numbers correspond to like components from FIG. 1, there is schematically depicted an hybrid powertrain generally indicated at 10'. The hybrid powertrain 10' includes a four-stroke internal combustion engine 82, the electric motor 14, and the transmission 16. The four-stroke internal combustion engine 82 includes a crankshaft 84 operatively connected to the transmission 16 and the electric motor 14 so that the four-stroke internal combustion engine 82 and the electric motor 14 are in parallel hybrid combination. The four-stroke internal combustion engine 82 is configured to be operable in the HCCI mode of operation for at least a portion of the range of operation of the four-stroke internal combustion engine 82.

The four-stroke internal combustion engine 82 includes a cylinder case or block 86 defining a crankcase volume 88. The cylinder block 86 further defines a cylinder bore 90 within which a piston 92 is reciprocally movable. The piston 92 is mounted to a connecting rod 94, which is mounted to the crankshaft 84 to provide reciprocal motion within the cylinder bore 90 between the BDC position and the TDC position. The crankshaft 84 is at least partially disposed within the crankcase volume 88 and is rotatably supported by the cylinder block 86. The piston 92, connecting rod 94, and crankshaft 84 work in concert to convert the reciprocal motion of the piston 92 into rotational motion of the crankshaft 84. A cylinder head 96 is removably mounted with respect to the cylinder block 86 and operates to close one end of the cylinder bore 90. The piston 92, cylinder bore 90, and cylinder head 96 cooperate to form a variable volume combustion chamber 98.

The cylinder head 96 defines an intake port 100 and an exhaust port 102. The intake port 100 operates to communicate intake air 48 within an intake manifold 104 to an intake valve 106. The intake valve 106 is slidably disposed within the cylinder head 96 and operates to selectively introduce the intake air 48 to the variable volume combustion chamber 98. An exhaust valve 108 is slidably disposed within the cylinder head 96 and operates to selectively introduce exhaust gas 52 from the variable volume combustion chamber 98 to the exhaust port 102. An exhaust manifold 110 is mounted with respect to the cylinder head 96 and operates to communicate exhaust gas 52 from the exhaust port 102 to the remainder of the vehicular exhaust system, not shown, for subsequent release to the atmosphere. An exhaust gas recirculation, or EGR, system 112 may be provided to recirculate a fraction of the exhaust gas 52, as EGR gas 113, to the intake manifold 104 via an EGR passage 114. The mass flow rate of EGR gas 113 may be selectively and variably controlled by a high temperature resistant valve 116. Those skilled in the art will recognize that the introduction of EGR gas 113 into the intake air 48 may operate to reduce oxides of nitrogen, or NOx, emissions and improve fuel economy. Additionally, EGR gas 113 may provide a measure of stability to the internal combustion engine 82 when operating in the HCCI operating mode by heating the intake air 48 prior to entering the variable volume combustion chamber 98 thereby promoting auto-ignition.

An ignition device or spark plug 118 and a fuel injector 120 are provided at least partially within the cylinder head 96. The fuel injector 120 is configured and positioned to inject fuel 60, from the pressurized fuel source 62, directly into the variable volume combustion chamber 98. Alternate fueling strategies, such as port fuel injection and throttle body fuel injection may also be used in conjunction with certain aspects of the present invention; however, the preferred approach is direct injection. As discussed hereinabove, while widely available grades of gasoline and light ethanol blends thereof are preferred fuels, alternative liquid and gaseous fuels such as higher ethanol blends (E80, E85, etc.), neat ethanol (E99), neat methanol (M100), natural gas, hydrogen, biogas, various reformates, syngases, etc. may also be used in the implementation of the present invention. The spark plug 118 extends through the cylinder head 96 to the variable volume combustion chamber 98 and operates to provide an ignition source for the fuel 60 and intake air 48 mixture within the variable volume combustion chamber 98 during spark ignition operation of the four-stroke internal combustion engine 82.

Those skilled in the art will recognize that the crankshaft 84 of the four-stroke internal combustion engine 82 rotates through two revolutions or 720 degrees during each engine cycle. That is, the piston 92 within the four-stroke internal combustion engine 82 will move from the TDC position to the BDC position during what is termed the intake stoke wherein intake air 48, fuel 60, and/or EGR gas 113 is introduced to the variable volume combustion chamber 98. During the compression stroke, the piston 92 will move from the BDC position to the TDC position where the mixture of fuel 60, intake air 48, and/or EGR gas 113 is compressed to provide favorable conditions for combustion. Subsequently, the piston 92 will move from the TDC position to the BDC position during the power or expansion stroke. It is during the expansion stroke that rapidly expanding combustion gases urge the piston 92 downward to create power. The exhaust gases 52 are forced from the variable volume combustion chamber 98 as the piston 92 moves from the BDC position to the TDC position in what is commonly referred to as the exhaust stroke.

In operation, during light to moderate engine loads, the four-stroke internal combustion engine 82 operates in the HCCI combustion mode, wherein a predetermined amount fuel 60 is injected earlier than is typical to allow adequate premixing of fuel 60 and intake air 48. This fuel injection event typically occurs early in the intake stroke. The amount of fuel 60 injected provides a lean of stoichiometric air/fuel ratio such that premature auto-ignition of the intake air 48 and fuel 60 mixture is substantially avoided. As the piston 92 moves toward TDC of the compression stroke, a second injection of fuel 60 is performed. This second injection event operates to enrich the air/fuel ratio within the variable volume combustion chamber 98 to allow auto-ignition. Those skilled in the art will recognize other fuel injection strategies capable of enabling the HCCI mode of operation including varying the fuel injection timing as well as reducing or increasing the amount of fuel injected and the number of fuel injection events. The HCCI mode of operation is generally characterized as a controlled auto-ignition process with a lean of stoichiometric air/fuel ratio or a stoichiometric air/fuel ratio. The HCCI combustion process is further characterized by the lack of spark provided by the spark plug 118 to initiate combustion of the mixture of intake air 48 and fuel 60. At very light engine loads, the HCCI combustion may become unstable. An amount of EGR gas 113 may be introduced to the intake manifold 48 to heat the intake air 48 thereby aiding auto-ignition.

During high engine loads, the HCCI combustion may become unstable leading to rough engine operation. At higher engine loads, it may be beneficial to operate the internal combustion engine 82 in a spark-ignited mode of operation wherein the total amount of fuel 60 is injected into the variable volume combustion chamber 98. The intake air 48 and fuel 60 is then compressed by the piston 92 and ignited via a spark initiated by the spark plug 118 at a predetermined time. The controller 70 is configured to provide command signals to the spark plug 118 and fuel injector 120. Additionally the controller 70 is configured to provide command signals to control the valve 116.

The components and functionality of the transmission 16 of FIG. 2 are discussed hereinabove with reference to FIG. 1. As stated earlier, the HCCI operating mode generally occurs within a limited scope of engine load. Therefore, providing the transmission 16 having either continuously variable or closely spaced fixed ratios or a combination thereof in combination with electric motors 14 and 74 and battery 72 will allow the internal combustion engine 12 or 82 to maintain the HCCI combustion while the operation of the vehicle varies. The battery 72 and electric motors 14 and 74 act to level the power load on the engine, while the differential gearing 80 within the transmission 16 operate to maintain the rotational speed of the internal combustion engine 12 or 82 within a narrow operating range or to vary the rotational speed of the internal combustion engine 12 or 82 to optimize the HCCI mode of operation for a given engine power level.

Although the present invention has been described with reference to single cylinder internal combustion engines 12 and 82, those skilled in the art will recognize that the present invention is applicable to engines having multiple cylinders such as those having 3, 4, 5, 6, 8, 10, 12, or even 16 cylinders. Additionally, the forgoing description described both a two-stroke and four-stroke internal combustion engine 12 and 82, respectively, operable in a spark-ignited mode of operation. Those skilled in the art will recognize that the present invention may be applied to internal combustion engines operating in purely compression ignition modes, such as diesel engines while remaining within the scope of that which is claimed. As such, the ignition devices 56 and 118 would be glow plugs in lieu of spark plugs. Additionally, intake air heaters may be provided to aid combustion of the compression ignited engine. While the best modes for carrying out the invention have been described in detail, those familiar with the art to which this invention relates will recognize various alternative designs and embodiments for practicing the invention within the scope of the appended claims.

The invention claimed is:

1. A hybrid powertrain for a vehicle comprising:
    an internal combustion engine sufficiently configured for operation in a homogeneous charge compression ignition mode of operation, wherein said internal combustion engine includes;
        a variable volume chamber for compressing a mixture of at least intake air and fuel;
        a piston at least partially defining said variable volume chamber;
        a fuel injector sufficiently configured to inject said fuel directly into said variable volume chamber for combustion with said intake air;
        an ignition device in direct communication with said variable volume chamber for initiating combustion of said mixture;
        a controller operatively connected to said fuel injector and sufficiently configured to effect said homogeneous charge compression ignition mode of operation;
    a first motor and an energy storage device in hybrid combination with said internal combustion engine and sufficiently configured to selectively effect propulsion of the vehicle at low speeds exclusive of operation of said internal combustion engine; and
    a transmission operatively connected to said internal combustion engine and said first motor, and arranged to optimize the homogeneous charge compression ignition mode of operation of the internal combustion engine for a given engine power level by at least each of a) maintaining a rotational speed of the internal combustion engine within a predetermined operating range and b) varying the rotational speed.

2. The hybrid powertrain of claim 1, wherein said transmission is characterized by a continuously variable speed ratio between said internal combustion engine and the output speed of said transmission.

3. The hybrid powertrain of claim 1, wherein said transmission is characterized by successive ratios in steps of an average of 1.4 or less over the operating ratio range of said transmission.

4. The hybrid powertrain of claim 1, wherein said internal combustion engine is a two-stoke internal combustion engine.

5. The hybrid powertrain of claim 1, wherein said internal combustion engine is a four-stoke internal combustion engine.

6. The hybrid powertrain of claim 1, wherein said ignition device is a spark plug, said spark plug being configured to enable operation of said internal combustion engine in a spark-ignited mode of operation.

7. The hybrid powertrain of claim 2, wherein said first motor is an electric motor, said electric motor being sufficiently configured to enable said continuously variable speed ratio.

8. The hybrid powertrain of claim 2, further comprising:
    a second motor;
    wherein said first and second motor is an electric motor; and
    wherein said transmission is an electrically variable transmission.

9. The hybrid powertrain of claim 8, wherein said electrically variable transmission is operable in a plurality of modes.

10. The hybrid powertrain of claim 5, wherein said four-stroke internal combustion engine further includes an exhaust gas recirculation system operable to communicate recirculated exhaust gas to said variable volume combustion chamber.

11. A powertrain comprising:
a two-stroke internal combustion engine operable in a homogeneous charge compression ignition mode of operation having
a cylinder bore defined by a cylinder block,
an intake port for admitting intake air into said cylinder,
an exhaust port for communicating exhaust gases from the cylinder bore,
a piston being reciprocally translatable within the cylinder between a top dead center position and a bottom dead center position, wherein said piston is operable to selectively block said intake and said exhaust ports,
a fuel injector configured to directly inject fuel into said cylinder bore for combustion with said intake air, and
a controller operatively connected to said fuel injector and sufficiently configured to effect said homogeneous charge compression ignition mode of operation;
an electric motor and an electric storage device in hybrid combination with said two-stroke internal combustion engine; and
a transmission operatively connected to said two-stroke internal combustion engine and said electric motor, and arranged to optimize the homogeneous charge compression ignition mode of operation of the internal combustion engine for a given engine power level by at least each of a) maintaining a rotational speed of the internal combustion engine within a predetermined operating range and b) varying the rotational speed.

12. The powertrain of claim 11, wherein said transmission is wherein the transmission is characterized by a continuously variable speed ratio.

13. The powertrain of claim 11, wherein said two-stroke internal combustion engine includes a spark plug configured to enable operation in a spark-ignited mode of operation.

14. The powertrain of claim 11, wherein said electric storage device is a battery.

15. A powertrain comprising:
a four-stroke internal combustion engine operable in a homogeneous charge compression ignition mode of operation having
a cylinder bore defined by a cylinder block,
an intake port for admitting intake air into said cylinder,
an intake valve operable to selectively communicate said intake air from said intake port to said cylinder bore,
an exhaust port for communicating exhaust gases from the cylinder bore,
an exhaust valve operable to selectively communicate said exhaust gas from said cylinder bore to said exhaust port,
a piston being reciprocally translatable within the cylinder between a top dead center position and a bottom dead center position,
a fuel injector configured to directly inject fuel into said cylinder bore for combustion with said intake air, and
a controller operatively connected to said fuel injector and sufficiently configured to effect said homogeneous charge compression ignition mode of operation;
an electric motor and an electric storage device in hybrid combination with said two-stroke internal combustion engine; and
a transmission operatively connected to said four-stroke internal combustion engine and said electric motor, and arranged to optimize the homogeneous charge compression ignition mode of operation of the internal combustion engine for a given engine power level by at least each of a) maintaining a rotational speed of the internal combustion engine within a predetermined operating range and b) varying the rotational speed.

16. The powertrain of claim 15, wherein said transmission is wherein the transmission is characterized by a continuously variable speed ratio.

17. The powertrain of claim 15, wherein said four-stroke internal combustion engine includes a spark plug configured to enable operation in a spark-ignited mode of operation.

18. The powertrain of claim 15, wherein said four-stroke internal combustion engine further includes a cylinder head mounted to said cylinder block, wherein at least one of said intake port an said exhaust port are at least partially defined by said cylinder head.

19. The powertrain of claim 16, wherein said electric storage device is a battery.

* * * * *